(12) United States Patent
Brothers et al.

(10) Patent No.: US 11,661,483 B1
(45) Date of Patent: May 30, 2023

(54) SYNTHESES OF POLYSILYLETHER POLYMERS IN ADDITIVE MANUFACTURING OF ENERGETIC MATERIALS

(71) Applicant: The United States of America as Represented by the Secretary of the Navy, Indian Head, MD (US)

(72) Inventors: Robert C. Brothers, Potomac, MD (US); Rebecca Wilson, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/300,536

(22) Filed: Aug. 4, 2021

(51) Int. Cl.
  C08G 77/06 (2006.01)
  C08G 77/18 (2006.01)
  C06B 45/10 (2006.01)
  C06B 21/00 (2006.01)
  C08G 77/34 (2006.01)

(52) U.S. Cl.
  CPC ............ *C08G 77/18* (2013.01); *C08G 77/06* (2013.01); *C06B 21/0033* (2013.01); *C06B 45/10* (2013.01); *C08G 77/34* (2013.01)

(58) Field of Classification Search
  CPC ......... C08G 77/06; C08G 77/18; C08G 77/34
  See application file for complete search history.

(56) References Cited

U.S. PATENT DOCUMENTS

| | | | | |
|---|---|---|---|---|
| 2,796,406 A | * | 6/1957 | Lorensen | C07F 7/0838 508/207 |
| 3,346,515 A | * | 10/1967 | Curry | C08G 77/60 528/38 |
| 3,423,362 A | * | 1/1969 | Ismail | C08G 77/60 524/588 |
| 3,691,119 A | * | 9/1972 | Tanquary | C08G 77/48 556/431 |

OTHER PUBLICATIONS

Cheng, Chen; Watts, Annabelle; Hillmyer, Marc; Hartwig, John. Polysilylether: A Degradable Polymer from Biorenewable Feedstocks. Anew. Chem. Int. Ed. (2016) 55, 11872-11876. DOI: 10.1002/anie.201606282.

Vijjamarri, Srikanth; Chidara, Vamshi; Du, Guodong. Versatile manganese Catalysis for the Synthesis of Poly Ksilylether)s from Diols and Dicarbonyls with Hydrosilanes. ACS Omega (2017) 2, 582-591. DOI: 10.1021/acsomega.6b00538.

Carraher, Charles. Production of Organometallic Polymers by the Interfacial Technique. I. Interfacial Production of Polyalkyloxysilanes and a Study of Some Reaction Variables. Journal of Polymer Science: Part A-1 (1969) 7, 2351-2358.

Carraher, Charles. Production of Organometallic Polymers by the Interfacial Technique. II. Kinetic Study of the Production of Polyoxyethyleneoxy(diphenylsilene) by the Interfacial Technique. Journal of Polymer Science: Part A-1 (1969) 7, 2359-2363.

Carraher, Charles. Production of Organometallic Polymers by the Interfacial Technique. V. Partial Mechanistic Study of the Production of Poly[alkyl(aryl)oxysilanes], Journal of Polymer Science: Part A-1 (1970) 8, 973-978.

Carraher, Charles. Production of Organometallic Polymers by the Interfacial Technique. X. Influence of the Nature of Base Employed on the Synthesis of Polysilylalkylene (arylene) diamines. Journal of Polymer Science: Part A-1 (1970) 8, 3051-3059.

Dunnavant, W. R.; Markle, R. A.; Stickney, P. B. Synthesis of Polyaryloxysilanes by Melt-Polymerizing Dianilino- and Diphenosysilanes with Aromatic Diols. Journal of Polymer Science: Part A-1 (1967) 5, 707-724.

Nagasaki, Yukio; Matsukura, Fumiaki; Kato, Masao. New Thermosensitive Rubbery Polymers. Synthesis of Poly (siloxyethylene glycol) and its Aqueous Solution Properties. Macromolecules (1996) 29, 5859-5863.

* cited by examiner

*Primary Examiner* — Margaret G Moore
(74) *Attorney, Agent, or Firm* — Fredric Zimmerman

(57) ABSTRACT

A method of making a polysilylether (PSE) polymer includes: cooling a solution of diethylamine to 0° C. under argon; adding cold dialkyldichlorosilane to form a first mixture; slowly warming the first mixture to form dialkylbis (diethylamino)silane; diluting the first mixture with hexane then filtering via cannula; evaporating the hexane and excess diethylamine; purifying the dialkylbis(diethylamino)silane under vacuum distillation; adding the dialkylbis(diethylamino)silane to a solution of diol dissolved in tetrahydrofuran to form a second mixture; heating the second mixture to 60° C. while reflux condensing, and cooling and concentrating the second mixture under vacuum to form a resultant mixture containing the polysilylether (PSE) polymer.

3 Claims, 6 Drawing Sheets

US 11,661,483 B1

SYNTHESES OF POLYSILYLETHER POLYMERS IN ADDITIVE MANUFACTURING OF ENERGETIC MATERIALS

STATEMENT OF GOVERNMENT USE

The invention described herein was made in the performance of official duties by employees of the Department of Navy and may be manufactured, used, licensed by or for the Government of the United States of America for any governmental purpose without payment of any royalties thereon.

FIELD OF THE INVENTION

The present invention relates to a method for developing mild and efficient syntheses of polysilylether (PSE) polymers for use as binders in the additive manufacturing (AM) of energetic and reactive materials. Some of these polymers are novel and some have previously been reported in the literature. However, none of these reported polymers were prepared by the mild, tolerant, and efficient syntheses described by the present invention.

BACKGROUND OF THE INVENTION

Introduction

Additive manufacturing (AM) of energetic and reactive materials offers several possibilities for manufacturing munitions. The most obvious advantage is safety, where having an automated manufacturing setup will reduce the danger posed to workers. Additive manufacturing, e.g., 3D printing, allows materials to be printed with unique shapes and geometries, offering specialized solutions to specific situations and enhanced performance by tailoring burn rate or detonation. In addition to manufacturing advantages, additive manufacturing offers several strategic advantages. Since 3D printers are portable, this technology would allow for on-demand production of mission specific items that could be generated in the field. Furthermore, the feedstocks can be prepared ahead of time and stored until they are needed for use. For example, in the case of thermoplastic printing, the filament can be spooled and stored until an object is required to be printed. Additionally, most new 3D printers have dual nozzles that could be used to mix two different feed stocks. This arrangement would allow for the separation of and safer storage of two reactive materials, such as fuel and oxidizer, which could be combined via AM prior to use.

One of the biggest challenges for 3D printing is obtaining a high solids loading, while retaining good printability. Since energetic formulations typically have a very high solids loading, it is imperative that the binder be capable of printing with a high solids loading. For this to be possible, a polymer with polar functional groups would be desirable for improving interactions with highly polar energetic materials or inorganic metal fuels. However, the polymer also needs to retain a semi-flexible backbone for printability. Silicon based polymers are known for having excellent printability properties, likely due to the flexibility of silicon-carbon or silicon-oxygen bonds. Additionally, the polar nature of a silicon-oxygen linkage is likely to offer favorable interactions with polar nitro groups on energetic molecules, and highly polar inorganic metals.

Numerous types of silicon-based polymers exist. The best known are silicones, also known as polysiloxanes. Polysiloxanes contain a repeating backbone of alternating silicon and oxygen atoms (—Si—O—Si—O—), where alkyl or aryl substituents are bonded to the silicon atoms. FIG. 1(a) shows a polysiloxane, in this case—polydimethylsiloxane, with a —Si—O—Si—O— repeating backbone, where dimethyl substituents are bonded to the silicon atoms. These polymers all have the same backbone chain, however, there has been extensive research into functionalizing the dialkyl substitutions to tweak the polymer properties.

Polysilylether (PSE) polymers are a similar, but slightly different group of silicon-based polymers. This class of polymers contains alternating units of dialkyl or diaryl silicon monomers and diol monomers. FIG. 1(b) shows a polysilylether, in this case—poly(ethylene glycol)dimethylsilylether, with a —Si—O-CarbonGroup-O—Si—O-CarbonGroup-O repeating backbone that has an alkyl or aryl substituent, in this case—dimethyl, bonded to the silicon atoms, and an alkyl or aryl linker group, in this case—ethylene, linking the oxygen atoms. Thus, PSE polymers have a repeating backbone of a silicon atom bonded to an oxygen atom that is then bonded to a carbon group which, in turn, is bonded to another oxygen atom (—Si—O-CarbonGroup-O—Si—O-CarbonGroup-O—), as shown in FIG. 1(b). PSE polymers are unique in that they are highly tailorable along the polymer backbone, thus allowing for manipulation of their physical properties. Additionally, these polymers can further be tailored based on the functionalization of the starting monomers prior to polymerization.

Polysilylether (PSE) polymers are extremely appealing for multiple reasons. In addition to good printability and high solids loading tolerance, these polymers are expected to retain the desirable properties of other silicon-based polymers i.e., good thermal and mechanical properties. Furthermore, preliminary work indicates that these polymers may offer an appealing option for biodegradable polymeric materials. Additionally, the synthesis of these materials offers several advantages. The modular synthesis of a diol monomer reacting with a silicon monomer means that these polymers will be highly tailorable based on which monomers are used in the polymerization reaction. This synthesis will allow structure optimization to obtain a polymer with ideal properties to function as a binder in additive manufacturing of energetic materials. Moreover, there is further tailor-ability for the base structure of the polymer. The monomers used in this reaction can be functionalized prior to polymerization, offering polymers with specific functionalities for different applications. For example, iodo-, fluoro-, or nitro-groups, could be incorporated to obtain a resulting polymer with biocidal, metal oxidizing, or energetic properties. This chemistry, to functionalize diols or silicon monomers, has been widely studied and is well documented in the literature.

Preparation of Polysilylether (PSE) Polymers

The literature, however, reports limited work on the syntheses and study of polysilylethers (PSEs). Most reported efforts involve using highly expensive Rhodium catalysts, which were determined to be undesirable for this effort. More recently, a less expensive Manganese catalyst was demonstrated to be useful for the synthesis of PSE polymers. However, this catalyst could also participate in side reactions that could be problematic in future efforts to prepare functionalized polymers. Therefore, our efforts focused on developing mild and efficient syntheses for polysilylether (PSE) polymers. Some of these polymers are novel and some have previously been reported in the literature. However, none of these reported polymers have been prepared by the mild, tolerant, efficient, and optimized syntheses described by the present invention. Additionally, there have been no prior efforts to explore the application of these PSE polymers as binders in the additive manufacturing (AM) of energetic and reactive materials.

Optimization of the syntheses for polysilylether (PSE) polymers involved exploring several different polymerization reactions. Initial efforts focused on reacting a commercially available dialkyldichlorosilane, i.e., dimethyldichlorosilane, with a commercially available diol, i.e., ethylene glycol, under anhydrous conditions to obtain the resulting PSE polymer, i.e., poly(ethylene glycol)dimethylsilylether, as shown by FIG. 2, under various reaction conditions ("a" of FIG. 2) including different solvents, bases, times, temperatures, and pressures. These reactions appeared to proceed smoothly and upon evaporation of solvent they yielded sticky, goo-like products that appeared to be polymeric in structure. NMR analysis confirmed a one-to-one ratio of the individual starting monomers. This ratio remained constant regardless of any extractions or washing to purify the polymer, indicating that the monomers were linked together. However, upon GPC analysis these materials were found to be very short oligomers of only four to six units. Adjusting reaction time, reaction temperature, reaction pressure, type of solvent and solvent quantity, as well as type and quantity of base were unsuccessful at improving the chain length for these polymers. Therefore, it became apparent that another synthetic approach would be necessary to obtain the desired materials with higher molecular weights.

Other work on preparing PSE polymers indicates it is necessary to convert the dialkyldichlorosilane into a monomer with different reactivity to obtain polymers with high molecular weights. In this work, the dialkyldichlorosilane was converted into the dialkyldianilinosilane derivative by reaction "a" of FIG. 3, which required: aniline, pyridine, 24° C., and 20 h, which was then polymerized with aromatic diols, according to reaction "b" of FIG. 3, which required hydroquinone and solvent-free melt polymerization under vacuum at 300° C. This approach relied on using very high reaction temperatures to distill off aniline as the polymer was formed, thus forcing the chemistry toward the desired product. However, this chemistry was not demonstrated on non-aromatic diols, likely because these monomers have lower boiling points and would distill off the reaction before polymerizing. Efforts to replicate the synthesis were unsuccessful in obtaining the desired products. Additionally, it was determined that the harsh reaction conditions were unsuitable for developing polymers with the desired sensitive functional groups (such as nitro, iodo, and fluoro moieties). Furthermore, the reported aromatic-based polymers were brittle solids with extremely high melting points that would be unsuitable for use as binders. For these reasons, it became apparent that another approach would be necessary.

Recently, a similar reactivity approach was used to produce end-linked copolymers of polydimethylsiloxane and polyethylene glycol polymers. In this approach the terminal silicon atoms on polydimethylsiloxane were functionalized with diethyl amine and reacted with hydroxyl terminated polyethylene glycol to give the resulting copolymer by reaction "a", shown in FIG. 4, which required THF, 60° C. and 24 h. Published results indicated good reactivity and obtained a high degree of polymerization. This approach, however, has not been used to produce PSE polymers.

In this invention, PSE polymers were successfully synthesized using a similar, although different approach, to the above-mentioned copolymer synthesis. In this different approach dialkyldichlorosilanes were converted into dialkylbis(diethylamino)silanes, which were then polymerized with various diols to obtain the resulting PSE polymer, as shown by FIG. 5, where reaction "a" requires diethyl amine, 0° C.→rt, 20 h and hexane, while reaction "b" requires ethylene glycol, THF, 60° C. and 4 d. The model system for developing the chemical syntheses of PSE polymers was based on the monomers dimethyldichlorosilane and ethylene glycol, as shown in FIG. 5. Based on another reported procedure, dimethyldichlorosilane was converted into dimethylbis(diethylamino)silane by reaction "a" of FIG. 5. Afterwards, polymerizations between dimethylbis(diethylamino)silane and ethylene glycol were studied using the reaction shown in FIG. 4, to optimize for the desired PSE polymer resulting from reaction "b" of FIG. 5. Reaction condition variations for the chemical syntheses of PSE polymers included changing reaction solvent, reaction time, and reaction temperature. The best results were obtained using THF as the solvent, while reacting at 60° C. for 4 days. The resulting PSE polymers were found to have a 1:1 ratio of the monomer units according to NMR, and a MW of 150,000 according to GPC.

SUMMARY OF THE INVENTION

An exemplary embodiment of the invention describes a method of making a polysilylether (PSE) polymer. The method includes: cooling a solution of 5 equivalents of diethylamine in a Schlenk flask to 0° C. under argon; adding 1 equivalent of cold dialkyldichlorosilane, forming a first mixture; slowly warming the first mixture to room temperature, forming dialkylbis(diethylamino)silane; diluting the first mixture with hexane then filtering via cannula; evaporating the hexane and excess diethylamine; purifying the dialkylbis(diethylamino)silane under vacuum distillation; adding 1 equivalent of dialkylbis(diethylamino)silane to a solution of 1 equivalent of diol dissolved in 10 equivalents of tetrahydrofuran to form a second mixture; and heating the second mixture to 60° C. while reflux condensing, then cooling and concentrating the second mixture under vacuum, forming a resultant mixture containing the polysilylether (PSE) polymer.

Another exemplary embodiment of the invention describes a method of making a polysilylether (PSE) polymer. The method includes: cooling a solution of 5 equivalents of diethylamine in a Schlenk flask to 0° C. under argon; adding 1 equivalent of cold dialkyldichlorosilane, forming a first mixture; slowly warming the first mixture to room temperature, forming dialkylbis(diethylamino)silane; diluting the first mixture with hexane then filtering via cannula; evaporating the hexane and excess diethylamine; purifying the dialkylbis(diethylamino)silane under vacuum distillation; adding 1 equivalent of dialkylbis(diethylamino)silane to a solution of 1 equivalent of diol dissolved in 10 equivalents of tetrahydrofuran to form a second mixture; heating the second mixture to 60° C. while reflux condensing, then cooling and concentrating the second mixture under vacuum, forming a resultant mixture containing the polysilylether (PSE) polymer; dissolving the resultant mixture in dichloromethane and extracting unreacted monomers with water; and removing the dichloromethane under reduced pressure, giving a yield of the PSE polymer in a range of 80-90%.

Yet another embodiment of the invention describes a method of making a polysilylether (PSE) polymer. The method includes: cooling a solution of 5 equivalents of diethylamine in a Schlenk flask to 0° C. under argon; adding 1 equivalent of one of three dialkyldichlorosilanes to form a first mixture, the three dialkyldichlorosilanes consisting of: dimethyldichlorosilane, diphenyldichlorosilane, and methylphenyldiclorosilane; slowly warming the first mixture to room temperature, forming one of three dialkylbis(diethylamino)silanes corresponding to the one of three dialkyldichlorosilanes; diluting the first mixture with hexane then filtering via cannula; evaporating the hexane and excess diethylamine; purifying the one of three dialkylbis(diethylamino)silanes under vacuum distillation; adding 1 equivalent of the one of three dialkylbis(diethylamino)silanes to a solution of 1 equivalent of one of four diols dissolved in 10 equivalents of tetrahydrofuran to form a second mixture, the four diols consisting of: ethylene glycol, hydroquinone, 1,4-cyclohexanediol, and 1,6-hexanediol; heating the second mixture to 60° C. while reflux condensing, then cooling and concentrating the second mixture under vacuum, forming a resultant mixture containing a polysilylether (PSE) polymer made from the one of three dialkyldichlorosilanes and the one of four diols; dissolving the resultant mixture in dichloromethane and extracting unreacted monomers with water; and removing the dichloromethane under reduced pressure, giving a yield of the PSE polymer made from the one of three dialkyldichlorosilanes and the one of four diols in a range of 80-90%.

BRIEF DESCRIPTION OF THE DRAWINGS

Various non-limiting exemplary embodiments are further described with reference to the accompanying drawings in which.

DETAILED DESCRIPTION OF THE INVENTION

Figure 1B:
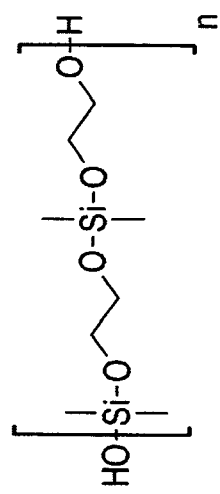
FIG. 1(b) illustrates Poly(ethylene glycol)dimethylsilylether, a polysilylether (PSE), with —Si—O-CarbonGroup-O—Si—O-CarbonGroup-O repeating backbone that has alkyl or aryl substituents, dimethyl in this case, off of the silicon atoms, and an alkyl or aryl linker group, ethylene in this case, between the oxygen atoms according to an embodiment of the invention.
Figure 1A:
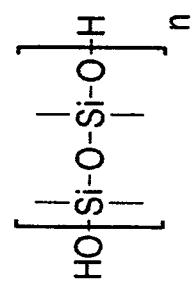
FIG. 1(a) illustrates a polysiloxane, i.e., poly dimethylsiloxane, with —Si—O—Si—O— repeating backbone and alkyl or aryl substituents, in this case—dimethyl, off of the silicon atoms according to an embodiment of the invention.
Figure 2:
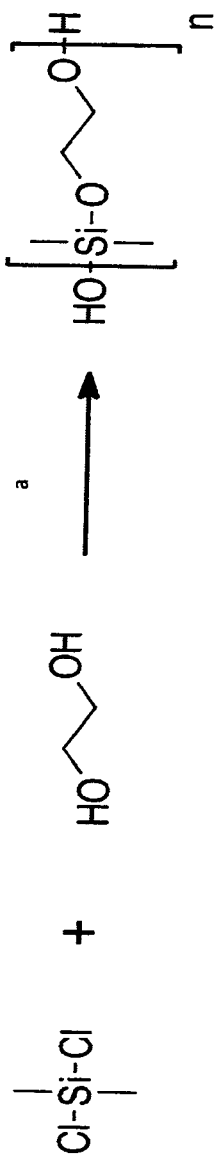
FIG. 2 illustrates the reaction of a dialkyldichlorosilane, i.e., dimethyldichlorosilane, and a diol, i.e., ethylene glycol, to produce a polysilylether (PSE), i.e., poly(ethylene glycol)dimethylsilylether according to an embodiment of the invention.
Figure 3:
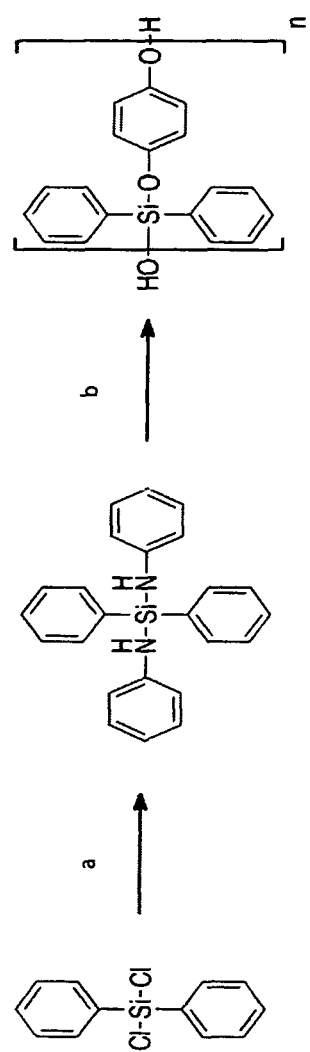
FIG. 3 illustrates a reported synthesis for aromatic PSE polymers, where reaction "a" requires aniline, pyridine, 24° C. and 20 h, while reaction "b" requires hydroquinone and solvent free melt polymerization under vacuum at 300° C. according to an embodiment of the invention.
Figure 4:
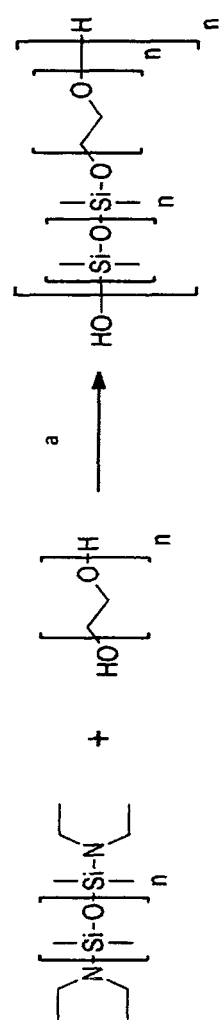
FIG. 4 illustrates a reported synthesis for the copolymer of polydimethylsiloxane and polyethylene glycol, where reaction "a" requires THF, 60° C. and 24 h according to an embodiment of the invention.
Figure 5:
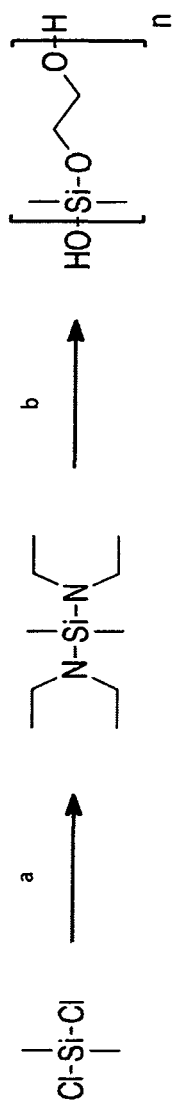
FIG. 5 illustrates the model reaction used to optimize a quick and efficient mild synthesis for PSE polymers. These reaction conditions were used to synthesize all PSE polymers of the invention, where reaction "a" requires diethyl amine, 0° C.→ rt, 20 h and hexane to convert a dialkyldichlorosilane, e.g., dimethyldichlorosilane, to a dialkylbis (diethylamino)silane, e.g., dimethylbis(diethylamino)silane, while reaction "b" polymerizes the dialkylbis(diethylamino) silane with a diol, e.g., ethylene glycol, THF, 60° C. and 4 d according to an embodiment of the invention.

The optimized method of chemical syntheses for PSE polymers, shown in FIG. 5, was used to synthesize the PSE polymers of the invention.

Reaction "a" of FIG. 5 illustrates the conversion of a dialkyldichlorosilane into a dialkylbis(diethylamino)silane monomer. The conversion took place in a stirred solution of diethylamine (5 equivalents) in a Schlenk flask with a positive flow of argon, which was cooled to 0° C. in an ice bath. Cold dialkyldichlorosilane (1 equivalent) was added dropwise slowly. The reaction mixture was allowed to stir overnight, while slowly warming to room temperature. The reaction mixture was diluted with hexane and cannula filtered. The hexane and excess diethyl amine were removed by evaporation. The product was purified by vacuum distillation, giving the resulting dialkylbis(diethylamino)silane derivative in yields ranging from 30-50% depending on the alkyl groups.

Reaction "b" of FIG. 5 illustrates the polymerization of the dialkylbis(diethylamino)silane monomer and a diol monomer to produce the PSE polymer of the invention. A stirred solution of diol (1 equivalent) dissolved in THF (10 equivalents) was prepared in a round bottom flask. Dialkylbis(diethylamino)silane (1 equivalent) was added to the reaction mixture. A reflux condenser was attached to the round bottom flask and the reaction was heated to 60° C. for four days. The reaction mixture was allowed to cool then slowly concentrated under vacuum. The resulting mixture was isolated by dissolving in DCM and extracting with water to remove any unreacted monomers. Removing DCM under reduced pressure gave the desired polysilylether polymer in yields ranging from 80-90%.

Figure 6:
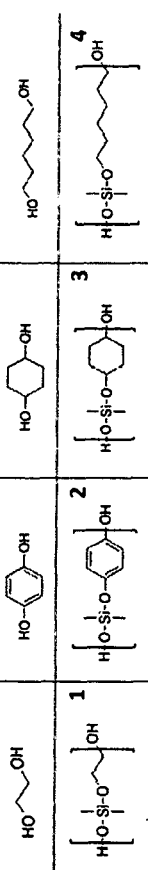
FIG. 6 illustrates a table that shows twelve resulting PSE polymers, each PSE polymer being identified by a bold-faced number, that were prepared using the optimized model reaction shown in FIG. 5 using from top to bottom, three silicon-based monomers: bis(diethylamino)dimethylsilane, bis(diethylamino)diphenylsilane, and bis(diethylamino)methylphenylsilane; and four diol monomers: ethylene glycol, hydroquinone, 1,4-cyclohexanediol and 1,6-hexanediol.

FIG. 6 illustrates the syntheses of 12 different PSE polymers in a tabular format, where each individual PSE polymer is identified by a bold-faced number. Four different diol monomers: ethylene glycol, hydroquinone, 1,4-cyclohexanediol and 1,6-hexanediol (shown left to right along the x-axis of the table) each of which was paired with one of three different silicon-based monomers: bis(diethylamino) dimethylsilane, bis(diethylamino)diphenylsilane, and bis(diethylamino)methylphenylsilane (shown top to bottom along the y-axis of the table) produced the 12 different PSE polymers.

In FIG. 6, PSE polymer 1, poly(ethylene glycol)dimethylsilylether, resulted from the polymerization of bis(diethylamino)dimethylsilane with ethylene glycol. Similarly, PSE polymer 2, poly(hydroquinone)dimethylsilylether, resulted from the polymerization of bis(diethylamino)dimethylsilane with hydroquinone. PSE polymer 3, poly(1,4-cyclohexanediol)dimethylsilylether, resulted from the polymerization of bis(diethylamino)dimethylsilane with 1,4-cyclohexanediol. PSE polymer 4, poly(1,6-hexanediol) dimethylsilylether, resulted from the polymerization of bis (diethylamino)dimethylsilane with 1,6-hexanediol. PSE polymer 5, poly(ethylene glycol)diphenylsilylether, resulted from the polymerization of bis(diethylamino)diphenylsilane with ethylene glycol. PSE polymer 6, poly(hydroquinone)diphenylsilylether, resulted from the polymerization of bis(diethylamino)diphenylsilane with hydroquinone. PSE polymer 7, poly(1,4-cyclohexanediol)diphenylsilylether, resulted from the polymerization of bis(diethylamino)diphenylsilane with 1,4-cyclohexanediol. PSE polymer 8, poly(1,6-hexanediol)diphenylsilylether, resulted from the polymerization of bis(diethylamino)diphenylsilane with 1,6-hexanediol. PSE polymer 9, poly(ethylene glycol)methylphenylsilylether, resulted from the polymerization of bis(diethylamino)methylphenylsilane with ethylene glycol. PSE polymer 10, poly(hydroquinone)methylphenylsilylether, resulted from the polymerization of bis(diethylamino)methylphenylsilane with hydroquinone. PSE polymer 11, poly(1,4-cyclohexanediol)methylphenylsilylether, resulted from the polymerization of bis(diethylamino)methylphenylsilane with 1,4-cyclohexanediol. PSE polymer 12, poly(1,6-hexanediol)methylphenylsilylether, resulted from the polymerization of bis(diethylamino)methylphenylsilane with 1,6-hexanediol.

The PSE polymers produced were diverse, ranging from fluid liquids (e.g., PSE polymers 1 and 4), to viscous goos (e.g., PSE polymers 5 and 8), to thermoplastic solids (e.g., PSE polymers 6 and 7), as well as PSE polymers with properties in between. Structural confirmation of these polymers was determined by NMR analysis. All polymers exhibited a one-to-one ratio of the respective starting monomers. Molecular weights of the polymers were determined by GPC analysis). Thermal decomposition was determined by TGA analysis. Glass transition temperature was determined by DSC analysis. Additionally, a melting point apparatus was used to determine the melting point for the two thermoplastic solids, i.e., PSE polymers 6 and 7.

Based on the initial data obtained for the PSE polymers described above, some general takeaways can be determined. First, the optimized synthesis successfully generated polymers in each scenario. This result indicates the synthesis is mild and tolerant of different groups and will likely work for the polymerization of functionalized monomers (e.g., nitro, fluoro, or iodo). Second, these materials are highly tailorable based on the monomers used for the polymerization, thus giving a great diversity of polymers. These polymers ranged from fluid-liquids to oily-liquids, to pastes, to viscous goos, to taffy-like materials, and to thermoplastic solids. This diversity allows PSE polymers to have a variety of potential applications moving forward. Third, for the most part, the thermal decomposition temperatures were high, and the glass transition temperatures were low, thus indicating a good operating temperature range for most of these polymers. Fourth, the thermoplastic solids, PSE polymers 6 and 7, had ideal softening and melting temperatures to be used for filament generation and extrusion. Finally, molecular weights for the materials ranged. However, the majority were in the 2-6 k molecular weight range, indicating high MW polymers were not obtained. This characteristic differed from the high molecular weight observed for the model system, i.e., PSE polymer 1, which was used for synthesis optimization. It is likely that conditions would need to be optimized for each individual polymer to achieve higher molecular weights. However, this optimization is not necessary for binder development since lower molecular weight HTPB (~2 k) is typically used in formulations and cured with an isocyanate. Therefore, these PSE polymers are well suited to move on to formulation studies in their current form.

The invention has been described with references to specific embodiments. While particular values, relationships, materials, and steps have been set forth for purposes of describing concepts of the invention, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain exemplary embodiments and modifications of the concept underlying the present invention, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A method of making a polysilylether (PSE) polymer, comprising:
    cooling a solution of 5 equivalents of diethylamine in a Schlenk flask to 0° C. under argon;
    adding 1 equivalent of dialkyldichlorosilane, forming a first mixture;
    slowly warming the first mixture to room temperature, forming dialkylbis(diethylamino)silane;
    diluting the first mixture with hexane then filtering via cannula;
    evaporating the hexane and excess diethylamine;
    purifying the dialkylbis(diethylamino)silane under vacuum distillation;
    adding 1 equivalent of dialkylbis(diethylamino)silane to a solution of 1 equivalent of diol dissolved in 10 equivalents of tetrahydrofuran to form a second mixture; and
    heating the second mixture to 60° C. while reflux condensing, then cooling and concentrating the second mixture under vacuum, forming a resultant mixture containing the polysilylether (PSE) polymer.

2. A method of making a polysilylether (PSE) polymer, comprising:
- cooling a solution of 5 equivalents of diethylamine in a Schlenk flask to 0° C. under argon;
- adding 1 equivalent of dialkyldichlorosilane, forming a first mixture;
- slowly warming the first mixture to room temperature, forming dialkylbis(diethylamino)silane;
- diluting the first mixture with hexane then filtering via cannula;
- evaporating the hexane and excess diethylamine;
- purifying the dialkylbis(diethylamino)silane under vacuum distillation;
- adding 1 equivalent of dialkylbis(diethylamino)silane to a solution of 1 equivalent of diol dissolved in 10 equivalents of tetrahydrofuran to form a second mixture;
- heating the second mixture to 60° C. while reflux condensing, then cooling and concentrating the second mixture under vacuum, forming a resultant mixture containing the polysilylether (PSE) polymer;
- dissolving the resultant mixture in dichloromethane and extracting unreacted monomers with water; and
- removing the dichloromethane under reduced pressure, giving a yield of the polysilylether (PSE) polymer in a range of 80-90%.

3. A method of making a polysilylether (PSE) polymer, comprising:
- cooling a solution of 5 equivalents of diethylamine in a Schlenk flask to 0° C. under argon;
- adding 1 equivalent of one of three dialkyldichlorosilanes to form a first mixture, the three dialkyldichlorosilanes consisting of: dimethyldichlorosilane, diphenydichlorolsilane, and methylphenyldichlorosilane;
- slowly warming the first mixture to room temperature, forming one of three dialkylbis(diethylamino)silanes corresponding to the one of three dialkyldichlorosilanes;
- diluting the first mixture with hexane then filtering via cannula;
- evaporating the hexane and excess diethylamine;
- purifying the one of three dialkylbis(diethylamino)silanes under vacuum distillation;
- adding 1 equivalent of the one of three dialkylbis(diethylamino)silanes to a solution of 1 equivalent of one of four diols diol dissolved in 10 equivalents of tetrahydrofuran to form a second mixture, the four diols consisting of: ethylene glycol, hydroquinone, 1,4-cyclohexanediol, and 1,6-hexanediol;
- heating the second mixture to 60° C. while reflux condensing, then cooling and concentrating the second mixture under vacuum, forming a resultant mixture containing a polysilylether (PSE) polymer made from the one of three dialkyldichlorosilanes and the one of four diols;
- dissolving the resultant mixture in dichloromethane and extracting unreacted monomers with water; and
- removing the dichloromethane under reduced pressure, giving a yield of the polysilylether (PSE) polymer made from the one of three dialkyldichlorosilanes and the one of four diols in a range of 80-90%.

* * * * *